(12) United States Patent
Bassett

(10) Patent No.: US 9,228,665 B2
(45) Date of Patent: Jan. 5, 2016

(54) PRESSURE FUSE OR BREAKER

(71) Applicant: 3M INNOVATIVE PROPERTIES COMPANY, St. Paul, MN (US)

(72) Inventor: Laurence W. Bassett, Killingworth, CT (US)

(73) Assignee: 3M Innovative Properties Company, St. Paul, MN (US)

(*) Notice: Subject to any disclaimer, the term of this patent is extended or adjusted under 35 U.S.C. 154(b) by 268 days.

(21) Appl. No.: 13/929,054

(22) Filed: Jun. 27, 2013

(65) Prior Publication Data

US 2014/0000723 A1 Jan. 2, 2014

Related U.S. Application Data

(60) Provisional application No. 61/667,103, filed on Jul. 2, 2012.

(51) Int. Cl.
| | |
|---|---|
| *F16K 17/00* | (2006.01) |
| *F16K 31/56* | (2006.01) |
| *F16K 17/164* | (2006.01) |

(52) U.S. Cl.
CPC ............. *F16K 17/00* (2013.01); *F16K 17/164* (2013.01); *F16K 31/56* (2013.01); *Y10T 137/0379* (2015.04); *Y10T 137/7722* (2015.04); *Y10T 137/7728* (2015.04)

(58) Field of Classification Search
CPC ....... F16K 17/00; F16K 31/56; F16K 17/164; Y10T 137/7722; Y10T 137/7728; Y10T 137/0379; Y10T 137/7723; Y10T 137/773; Y10T 137/7734
See application file for complete search history.

(56) References Cited

U.S. PATENT DOCUMENTS

| | | | | |
|---|---|---|---|---|
| 2,037,302 | A | * | 4/1936 | Barnett ..................... 137/463 |
| 2,587,358 | A | * | 2/1952 | McRae ...................... 137/463 |
| 2,620,820 | A | * | 12/1952 | Born .......................... 137/458 |
| 3,424,194 | A | * | 1/1969 | Hetz et al. ................. 137/461 |
| 3,580,271 | A | * | 5/1971 | Farrer ........................ 137/458 |
| 3,892,258 | A | * | 7/1975 | Hendrick .................. 137/461 |
| 4,067,355 | A | * | 1/1978 | St. Clair ................... 137/458 |
| 2008/0257420 | A1 | * | 10/2008 | Faillat et al. ............. 137/460 |
| 2011/0068285 | A1 | * | 3/2011 | Rief et al. ................ 251/63.4 |

* cited by examiner

*Primary Examiner* — Jessica Cahill
(74) *Attorney, Agent, or Firm* — Scott A. Baum

(57) ABSTRACT

Described are pressure fuses or pressure breakers which regulate the pressure downstream from the device. When the fluid pressure exceeds the trip pressure, the pressure fuse or breaker will trip and protect other components downstream of the fuse or breaker. Also described are methods of regulating pressure downstream from a fluid source using such fuses or breakers.

14 Claims, 2 Drawing Sheets

PRESSURE FUSE OR BREAKER

CROSS REFERENCE TO RELATED APPLICATION

This application claims priority to Provisional Application No. 61/667,103, filed Jul. 2, 2012, the disclosure of which is incorporated by reference in its entirety herein.

TECHNICAL FIELD

Embodiments of the present invention relate to devices and methods for regulating pressure downstream from a fluid source.

BACKGROUND

Water filtration units and other components in fluid systems may be susceptible to damage when exposed to high fluid pressures. Even when users are aware of the pressure requirements of these components, this is not a guarantee against exposure to these high pressures from surges in fluid pressure or from misuse.

In order to protect against high pressures, design requirements for plastic pressure vessels have become more stringent. One current trend is to utilize thicker walled engineering plastic with higher safety factors. However, using these more durable materials increases the cost of the components and systems incorporating these components.

Therefore, there is a need for devices and methods to regulate pressure in fluid systems.

SUMMARY

One or more embodiments of the present invention pertain to a mechanical device that can detect pressure and act as a fuse to shut off the source of that pressure. In some embodiments, after the pressure source is shut off, the device may be reset by the user, thus making the device reusable like a circuit breaker.

In a first aspect, provided is pressure fuse comprising a housing having an inlet and an outlet, a valve in fluid communication with the inlet; and a trip mechanism in contact with the valve. The trip mechanism may have at least two states, wherein in the first state, the valve is in an open position thereby allowing fluid flow into the inlet, and in the second state, the valve is in a closed position thereby blocking fluid flow from the inlet. According to one or more embodiments, the trip mechanism moves from the first state to the second state when the pressure within the housing is greater than or equal to a trip pressure. The trip pressure may be a predetermined pressure selected to protect one or more components downstream from the housing.

In one or more embodiments, the trip mechanism comprises a hinge and a piston, and an increase in the pressure within the housing moves the piston such that it engages the hinge and the trip mechanism moves from the first state to the second state. The hinge may comprise a sliding pivot, a center pivot, a fixed pivot, a first piece connecting the sliding pivot to the center pivot and a second piece connecting the center pivot to the fixed pivot. The sliding pivot may in contact with the valve, and movement of the sliding pivot towards the fixed pivot closes the valve. In some embodiments, the piston comprises a trip ring or other feature that engages the hinge at one or both of the first piece and the second piece. The pressure fuse may also comprise one or more hinge rests.

According to one or more embodiments, the pressure fuse is resettable. In some embodiments, the pressure fuse comprises a reset button that moves the trip mechanism from the second state to the first state to reset the fuse. The reset button may in contact with or extending from the piston, and pushing the reset button may move the piston such that it engages the hinge and the trip mechanism moves from the second state to the first state. Alternatively, the pressure fuse may be non-resettable.

In some embodiments, when the trip mechanism is in the second state, pressure may leak out of the housing through the inlet when the pressure upstream from the valve is less than the pressure downstream from the valve.

Another aspect of the present invention pertains to a method of regulating pressure downstream from a fluid source comprising using a pressure fuse as described herein. The trip pressure of the pressure fuse may be a predetermined pressure selected to protect one or more components downstream from the housing. In one or more embodiments, the trip pressure is less than or equal to 125 psi or less than or equal to 100 psi.

In some embodiments of this aspect, the pressure fuse is resettable. In other embodiments, the pressure fuse is non-resettable.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Provided are pressure fuses and breakers that may protect other components downstream of the fuse or breaker. Use of these fuses or breakers may reverse the trend to use thicker walled engineering plastic in components of fluid systems, and instead allow use of commodity plastics with thinner walls such as unfilled polypropylene. By using these commodity plastics, the cost for producing plastic components may be lowered, and there is also an opportunity to have "greener" products because the commodity plastics could be recycled or reused.

Although specific reference is made to water filtration systems and other water systems, the methods and devices described herein may be used for other fluid systems, such as gas or air.

As used herein, a pressure fuse refers to a component that regulates the pressure downstream from the fuse such that the downstream pressure does not exceed a trip pressure. The term pressure fuse is a general term that encompasses both resettable and non-resettable devices.

A pressure breaker refers to a pressure fuse that is resettable.

Figure 1:
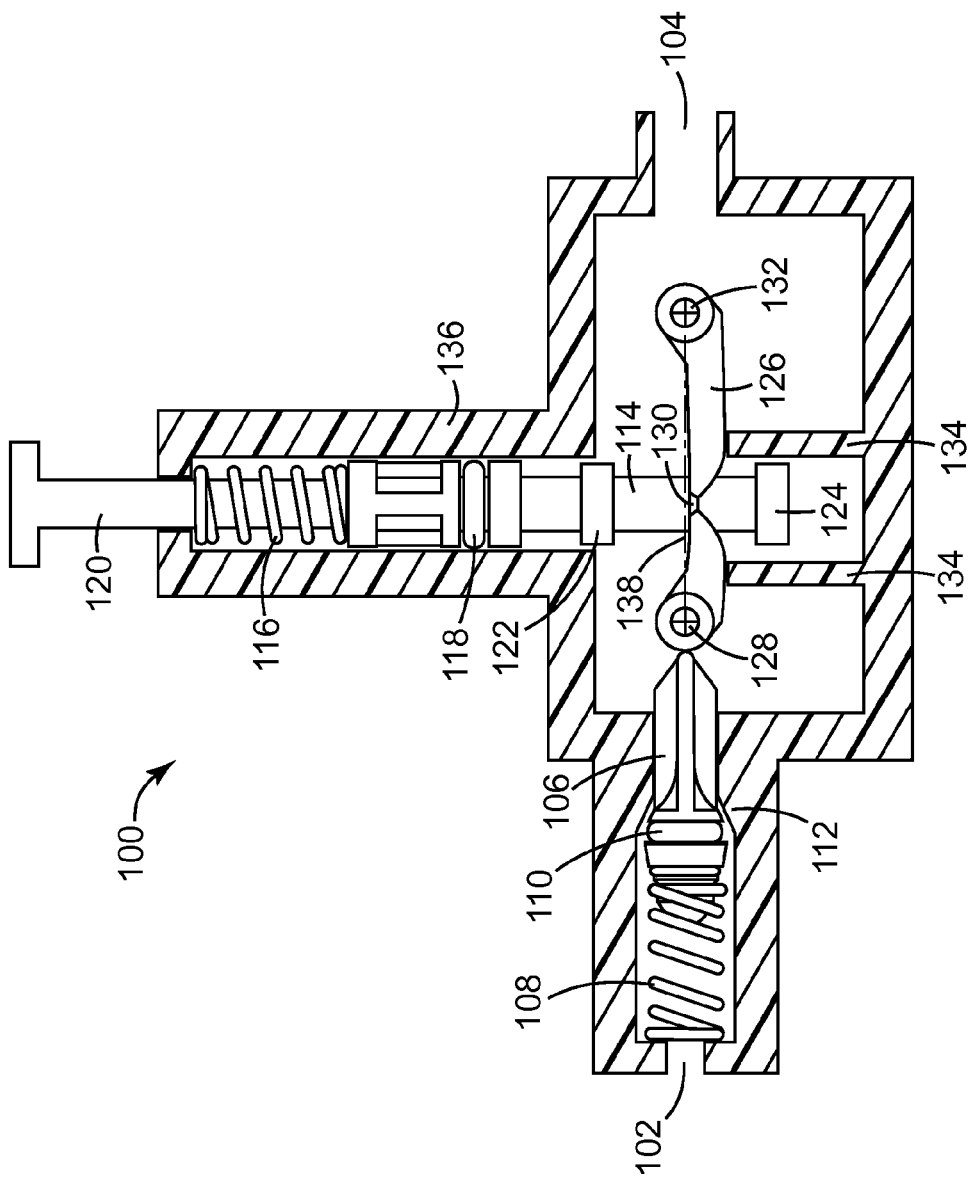
FIG. 1 is a cross-sectional view of a pressure fuse with a trip mechanism in the initial state in accordance with one or more embodiments of the invention.

One aspect of the present invention relates to a pressure fuse or breaker that may be used in a fluid system. FIG. 1 shows an exemplary pressure fuse 100 in accordance with one or more embodiments of the present invention. Pressure fuse 100 comprises a housing 136 having an inlet 102 and an outlet 104. A valve 106 is in fluid communication with the inlet 102, and may be connected to a valve spring 108 and a valve O-ring 110. When the valve 106 is in an open position, fluid may flow from the inlet 102, through the housing 136, and out the outlet 104. When the valve 106 is in a closed position, fluid flow from the inlet 102 is blocked. As shown in FIG. 1, valve 106 may be a poppet valve.

According to one or more embodiments, the pressure fuse 100 includes a trip mechanism in contact with valve 106. This trip mechanism begins in the initial or "untripped" state, thus allowing the valve 106 to be in an open position. The trip mechanism shown in FIG. 1 comprises a hinge 126 and a piston 114. Hinge 126 comprises two pieces connected at center pivot 130. The first piece connects the center pivot 130 and a sliding pivot 128, and the second piece connects center pivot 130 and fixed pivot 132. The center pivot 130 may be a pin connecting separate first and second pieces. Alternatively, center pivot 130 and the adjacent pieces may be a single integral piece with a living hinge.

In some embodiments, the first or second piece of hinge 126 may have two protrusions at the center pivot 130. The top protrusion may limit the travel in the over-center direction while the bottom protrusion may limit the travel in the other direction. In other embodiments, one or more hinge rests 134 limit the travel in the over-center direction.

Fixed pivot 132 may be held in place but allowed to rotate, whereas sliding pivot 128 may be allowed to rotate and translate towards and away from the piston 114. According to one or more embodiments, the pivot points for both sliding pivot 128 and fixed pivot 132 are held to the same horizontal centerline 138.

The valve spring 108 applies a force via the valve's tip to the left end of the trip mechanism. This applied force at or near the sliding pivot 128 pushes the sliding pivot 128 towards the fixed pivot 132, and the hinge 126 tends to yield and bend like a door hinge. However, the over-center linkage stop prevents the hinge from bending any further then the stop will allow. The over-center linkage stop may be a protrusion on the first or second piece, or the over-center linkage stop may one or more hinge rests 134. Because the hinge 126 cannot completely yield, the valve 106 will remain open. In some embodiments, there are no other significant forces acting on the trip mechanism when the trip mechanism is in this initial "untripped" operating state.

Piston 114 rides in a bore with a piston O-ring 118 to seal the pressure in the housing 136. The pressure in the housing 136 is countered by a piston spring 116. As the pressure in the housing 136 increases, the force on the O-ring 118 increases and the piston 114 moves up. The piston 114 movement is checked by the piston spring 116. The spring rate of piston spring 116 is selected such as to control the vertical movement of the piston 114 and to allow prediction of the position of piston 114 relative to the pressure in the housing 136.

The piston 114 may be fitted with rings or any other features that can interface with the trip mechanism. As shown in FIG. 1, piston 114 may be fitted with a trip ring 124 and a reset ring 122. The rings 122 and 124 may be fixed to the piston 114, and will ride and fall with the piston 114 as it is affected by pressure in the housing 136. As the pressure increases, piston 114 will move up and the trip ring 124 will engage the trip mechanism. The dimensional relationship of the trip ring 124 to the housing 136 is again coupled to the spring rate of piston spring 116.

In its initial or first state, the trip mechanism holds open the valve 106, and valve 106 also applies a force to the left end of the trip mechanism at or near sliding pivot 128. As the pressure in the housing 136 approaches the trip pressure, piston 114 moves up and the trip ring 124 begins to engage the trip mechanism. The hinge 126 will begin to straighten at the center pivot 130 until the center pivot 130 is aligned with the centerline 138. If the pressure is reduced once the center pivot 130 is aligned with the centerline 138, the hinge 126 will stall in the aligned position.

Figure 2:
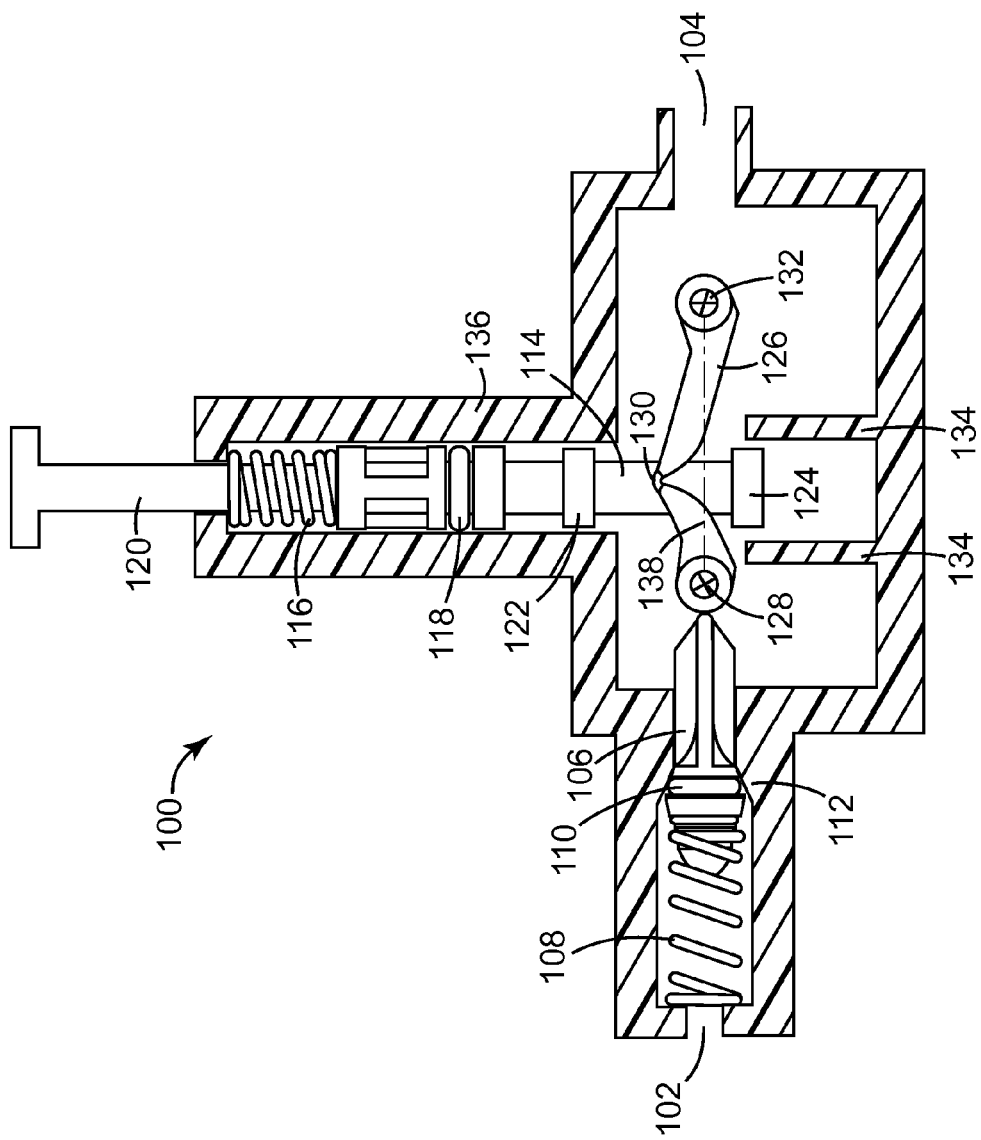
FIG. 2 is a cross-sectional view of a pressure fuse with a trip mechanism in the tripped state in accordance with one or more embodiments of the invention.

When the trip pressure is reached, the trip ring 124 will move hinge 126 out of its over-center condition. As soon as the center pivot 130 of the trip mechanism crosses above the centerline 138, the valve spring 108 will bend the hinge 128 like a door hinge and the trip mechanism will be tripped as shown in FIG. 2. In the tripped or second state, the trip mechanism will no longer prevent valve 106 from moving to the closed position, and the valve spring 108 will push valve 106 until the valve 106 seals against the inlet seat 112. This will almost instantaneously shut off the inlet water and thereby protect components downstream from the pressure fuse. Valve O-ring 110 will ensure a tight seal between the valve 106 and the inlet seat 112. A protrusion on the first or second piece of hinge 126 may be present to limit how much the hinge 126 is allowed to bend, to keep the trip mechanism in a position ready for reset.

As the travel of the piston 114 is known based on the relationship of the spring rate of piston spring 116 and the pressure in the housing 136, in some embodiments the pressure fuse 100 may further comprise an indicator feature to also trip outside of the device to inform the user the trip pressure was exceeded and that the device requires resetting or replacing. For example, the pressure fuse 100 may include a reset button 120 and a spring-loaded lever (not shown). The reset button 120 may rise out of the housing 136 when the trip pressure is exceeded, which will provide a visual indication to the consumer that the device needs to be reset. The spring-loaded lever may hold the reset button 120 in place and prevent it from lowering into the housing 136 if the pressure in the housing 136 is relieved but the device is not reset. The user would have to adjust the lever, and then push the reset button 120 to reset the device. Other indicator features could also be used to alert the user that the device has been tripped.

According to one or more embodiments, the trip pressure of the pressure fuse may be adjustable. For example, the position of the trip ring 124 may be adjustable relative to the piston 114, thus allowing the trip pressure to be adjustable. Adjusting the spring rate of piston spring 116 will also adjust the trip pressure. Furthermore, the vertical position of the piston 114 may be adjusted relative to the trip mechanism. Accordingly, an adjustable pressure fuse can be realized in a number of ways without making discrete devices for every trip pressure.

One potential advantage of having different trip pressures is that components with different pressure tolerances may each have their own individual pressure fuses. For example, one component with a maximum pressure tolerance of 60 psi may be downstream from a component having a maximum pressure tolerance of 95 psi. The component with the 60 psi pressure tolerance may have its own pressure fuse with a trip pressure of 60 psi or less, and tripping this individual fuse need not shut off the pressure in the entire system.

Also, as different countries utilize different baseline pressures, there may be a need for pressure fuses having a wide range of trip pressures. In countries with lower baseline pressures, components in fluid systems may have lower pressure tolerances because of the decreased risk of exposure to higher pressures. Accordingly, a pressure fuse of 100 psi may not be appropriate for protecting components used in countries with low baseline pressures.

When the pressure downstream of the pressure fuse 100 is relieved (such as by opening a faucet in the fluid system), the pressure in the system downstream from the valve 106 will be reduced to 0 psig. However, the piston-trip mechanism relationship may be chosen such that the trip mechanism could not be reset without consumer intervention. For example, the relationship may be chose such that reset ring is not in contact with the hinge 126 when the pressure in the vessel is at 0 psig.

When the pressure fuse 100 trips, the pressure upstream of the valve 106 will be at or above the trip pressure, such as at 95 psi or higher. The device and the system downstream from the valve 106 would also be at the trip pressure, but no higher, because this is the pressure in the system when the trip mechanism was tripped. If the downstream pressure is not relieved by opening a faucet or otherwise proving an outlet for the downstream pressure, the system would stay at the trip pressure. However, it may not be desirable to maintain a plastic pressure vessel at the trip pressure for an extended period of time. For example, plastic creep may slowly deform the components, even if they are kept at a pressure below their maximum pressure tolerance. Accordingly, in some embodiments, the pressure fuse may relieve the constant pressure that causes creep.

In the embodiment shown in FIG. 2, the valve 106, O-ring 110 and inlet seat 112 form a tight seal in the downstream direction, but not in the upstream direction. Thus, when the pressure is relieved upstream of the valve 106 to a pressure below the trip pressure, such as 60 psi, the higher pressure in the system downstream from the valve 106 would bleed past the valve 106 until equal pressure is reached. The higher downstream pressure will overcome the spring rate of valve spring 108, and thus will force open the valve 106. Once the pressure upstream and downstream of the valve 106 is equal, the valve spring 108 can now close the valve 106 because the trip mechanism is still in the tripped state with the center pivot 130 above the centerline 138. If upstream pressure rises again, the system downstream from the valve 106 would remain at the new lower pressure of 60 psi. If the upstream pressure is further lowered to 30 psi, the scenario above would repeat and the new system pressure would be 30 psi. This could continue to repeat, capturing the lowest upstream pressure, until the downstream pressure could no longer overcome the spring rate of the valve spring 108. The lower the system holding pressure, the lower the creep and the longer the system can hold pressure without damage.

In some embodiments, the pressure fuse may be designed to be non-resettable so that it must be replaced before the fluid system may be in full use. Thus, the pressure fuse may have a one-time use like an electrical fuse. In other embodiments, the pressure fuse is a pressure breaker that may be reset. In these embodiments, the pressure breaker is analogous to a resettable electrical circuit breaker. In order to be resettable, the piston 114 of the pressure fuse 100 may be fitted with a reset ring 122 or any other feature for interacting with the trip mechanism. A reset button 120 may be positioned at the top of the device. The reset button 120 may be attached to the piston 114 so that when the device is tripped, the reset button 120 may rise out of the housing 136 and the consumer knows to reset the device. When the reset button 120 is pressed, piston 114 and the reset ring 122 are lowered until the reset ring 122 interfaces the top of the trip mechanism. As the reset button 122 is pressed further, the continued travel of the piston 114 will start to straighten the hinge 126. As the hinge is straightened, the valve 106 is pressed out of the inlet seat 112 and the valve 106 is opened.

As it may be difficult to push the reset button 120 against high pressure, in some embodiments the consumer may need to relieve downstream pressure before resetting the pressure fuse. If a faucet is open downstream of the valve 106, the reset button 120 is only pressing against dynamic pressure. As soon as the center pivot 130 travels under the centerline 138 to the over-center position, it will lock again against the over center linkage stop. The trip mechanism is now returned to its initial state, and the fluid system may be put back into normal operation.

In one or more embodiments, there may be a limit to how far the piston 114 may travel to one prevent the piston O-ring 118 from exiting the bore, or to prevent damage to the trip mechanism due to over bending.

Another aspect of the present invention pertains to a method of regulating pressure downstream from a fluid source. The method may comprise providing a pressure fuse or breaker as described herein downstream from the fluid source. The pressure fuse may have any of the features previously described.

The pressure fuse may have a trip pressure at which the tripping mechanism moves from the first "untripped" state to the second "tripped" state. This trip pressure may be a predetermined pressure that is selected to protect one or more components of the fluid system. The trip pressure may vary depending on the pressure tolerance of the components in the fluid system and the baseline pressure in the system. In some embodiments, the trip pressure may be in the range from 10 psi to 200 psi. Exemplary trip pressures include 200, 150, 125, 110, 100, 95, 90, 85, 80, 75, 70, 65, 60, 55, 50, 45, 40, 35, 30, 25, 20, 15 and 10 psi. However, depending on the fluid system, the trip pressure may be higher or lower than these values. Some components such medium or high pressure hydraulic filters have pressure tolerances of 2000 psi, 4000 psi or even 5000 psi, and would therefore utilize pressure fuses with higher trip pressures.

In some embodiments of this method, the pressure fuse is resettable so that the consumer may reuse the fuse. In other embodiments, the pressure fuse is non-resettable such that the consumer must replace the fuse before continuing use of the system.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. A pressure fuse comprising:
a housing having an inlet and an outlet;
a valve in fluid communication with the inlet;
a trip mechanism comprising a hinge and a piston riding in a bore, and an increase in the pressure within the housing moves the piston such that it engages the hinge and the trip mechanism moves from a first state to a second state;
the trip mechanism in contact with the valve and having at least two states, wherein in the first state, the valve is in an open position thereby allowing fluid flow into the inlet, and in the second state, the valve is in a closed position thereby blocking fluid flow from the inlet, wherein when the pressure within the housing is greater than or equal to a trip pressure, the trip mechanism moves from the first state to the second state;

the hinge comprises a sliding pivot, a center pivot, a fixed pivot, a first piece connecting the sliding pivot to the center pivot and a second piece connecting the center pivot to the fixed pivot; and wherein the sliding pivot is in contact with the valve, and movement of the sliding pivot towards the fixed pivot closes the valve.

2. The pressure fuse of claim 1, wherein the piston comprises a trip ring that engages the hinge at one or both of the first piece and the second piece at the center pivot.

3. The pressure fuse of claim 1, further comprising one or more hinge rests.

4. The pressure fuse of claim 1, further comprising a reset button that moves the trip mechanism from the second state to the first state.

5. The pressure fuse of claim 1, further comprising a reset button in contact with or extending from the piston, wherein pushing the reset button moves the piston such that it engages the hinge and the trip mechanism moves from the second state to the first state.

6. The pressure fuse of claim 1, wherein when the trip mechanism is in the second state, pressure may leak out of the housing through the inlet when the pressure upstream from the valve is less than the pressure downstream from the valve.

7. The pressure fuse of claim 1, wherein the trip pressure is a predetermined pressure selected to protect one or more components downstream from the housing.

8. A method of regulating pressure downstream from a fluid source, the method comprising providing the pressure fuse of claim 1 downstream from the fluid source.

9. The method of claim 8, wherein the pressure fuse is resettable.

10. The method of claim 8, wherein the pressure fuse is non-resettable having a one-time use and must be replaced to regulate the pressure downstream of the fluid source.

11. The method of claim 8, wherein the trip pressure is a predetermined pressure selected to protect one or more components downstream from the housing.

12. The method of claim 11, wherein the trip pressure is less than or equal to 125 psi.

13. The method of claim 12, wherein the trip pressure is less than or equal to 100 psi.

14. A pressure fuse comprising:
a housing having an inlet and an outlet;
a valve in fluid communication with the inlet;
a trip mechanism comprising a hinge and a piston riding in a bore, and an increase in the pressure within the housing moves the piston such that it engages the hinge and the trip mechanism moves from a first state to a second state;
the trip mechanism in contact with the valve and having at least two states, wherein in the first state, the valve is in an open position thereby allowing fluid flow into the inlet, and in the second state, the valve is in a closed position thereby blocking fluid flow from the inlet, wherein when the pressure within the housing is greater than or equal to a trip pressure, the trip mechanism moves from the first state to the second state; and
wherein the piston comprises an O-ring sealing with the bore.

* * * * *